United States Patent [19]

Naaijer

[11] Patent Number: 4,616,223

[45] Date of Patent: Oct. 7, 1986

[54] SYSTEM OF IDENTIFYING LOCAL STATIONS BY A CENTRAL INTERROGATING STATION

[75] Inventor: Geert J. Naaijer, Louviers, France

[73] Assignee: U.S. Philips Corporation, New York, N.Y.

[21] Appl. No.: 557,574

[22] Filed: Dec. 2, 1983

[30] Foreign Application Priority Data

Dec. 3, 1982 [FR] France .................................. 8220289

[51] Int. Cl.[4] ........................ H04Q 9/14; G08B 11/00
[52] U.S. Cl. .......................... 340/825.54; 340/825.64; 340/870.24; 340/825.07; 340/825.36
[58] Field of Search ...................... 340/825.54, 825.36, 340/825.64, 825.65, 870.24, 825.2, 825.21, 505, 870.13, 870.14, 825.07

[56] References Cited

U.S. PATENT DOCUMENTS 4,435,706 3/1984 Callan ............................. 340/825.65
4,535,401 8/1985 Penn .................................... 340/505

Primary Examiner—Donald J. Yusko

Attorney, Agent, or Firm—Robert T. Mayer; Bernard Franzblau

[57] ABSTRACT

A station identification system comprising a central interrogating station (10) and M local stations (100, 200), etc. arranged in parallel with each other along a transmission bus (20) which connects them to said central station. Each local station is adapted to receive the interrogation signal supplied by the output stage of the central station (10) and to return a specific answer signal to this station. The answer signal represents the state of one or a plurality of detection circuits in said station. Each local station comprises a sequential loading circuit for the temporary storage of a digital identification word specific to each station, an encoder wheel (122) whose N outputs enable said N-bit identification word to be defined, $2^N$ being greater than or equal to the number M of stations, a discriminator circuit for the validation of said word, a comparator circuit for the comparison of said temporarily stored digital word with a digital reference word, and a circuit for returning the specific information to the central station when the words thus compared are identical.

9 Claims, 2 Drawing Figures

SYSTEM OF IDENTIFYING LOCAL STATIONS BY A CENTRAL INTERROGATING STATION

This invention relates to a station-identification system comprising a central interrogating station and a series of local stations arranged in parallel with each other along a transmission bus which connects them to the central station. Such a system is particularly suitable for use in the field of security or in collective interrogation systems as employed in training.

According to the invention such a system is characterized in that:

(A) the output stage of the central station, which stage serves to supply a station-interrogation signal comprising a synchronizing pulse of a first length during which it has a high level and M interrogation pulses of a second length during which they have a high level, comprises a d.c. system-supply source, a first transistor which, by a suitable drive at its control electrode, is turned on only in the intervals separating the pulses of the interrogation signal, second and third transistors which are turned on only during the pulses of the interrogation signal and which for this purpose are controlled by turning off the first transistor, and resistors associated with said transistors, which resistors provide the correct drive and bias of said transistors;

(B) each local station, which is adapted to receive the interrogation signal from the output stage of the central station and to return a specific answer signal to said central station, which answer signal represents the state of one or a plurality of detection circuits in said local station, comprises a sequential loading circuit for the temporary storage of a digital identification word which is specific to said station. The loading circuit for this purpose comprises a series network which comprises a diode and a capacitor and which is arranged in parallel with the bus and is connected to the input of an encoder wheel having N outputs that enable said N-bit digital identification word to be defined, $2^N$ being greater than or equal to the number M of stations. The local stations also include a discrimination circuit for validating said word, a comparator circuit for comparing said temporarily stored digital word with a digital reference word, and a circuit for returning the specific information to the central station when the words compared are identical.

BRIEF DESCRIPTION OF DRAWINGS

Embodiments of the invention will now be described in more detail, by way of example, with reference to the accompanying drawings, in which.

DETAIL DESCRIPTION OF DRAWINGS

Figure 1:
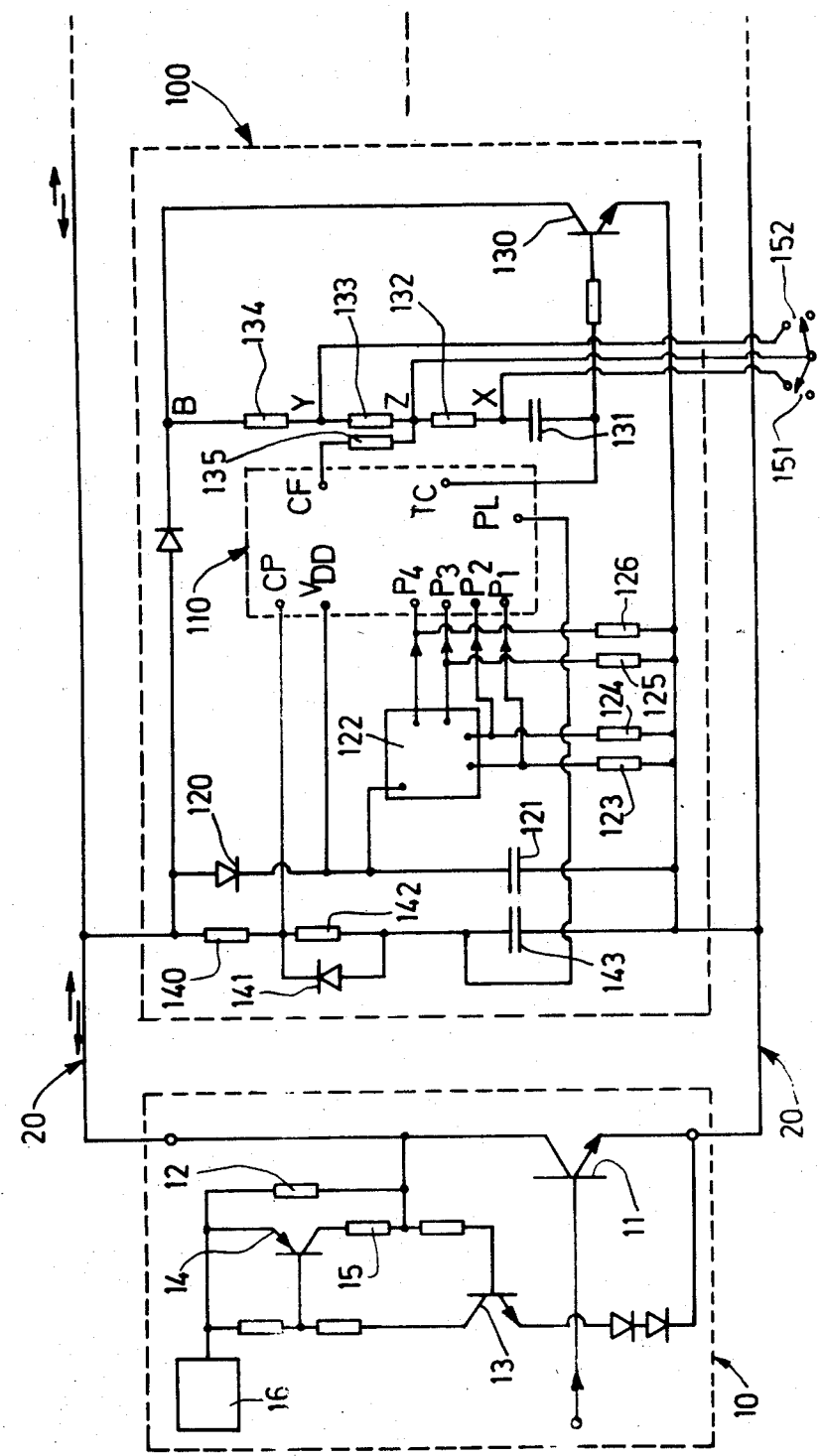
FIGS. 1 and 2 show a first and a second embodiment of the invention, respectively.

The station identification system described with reference to FIG. 1 comprises a central interrogating station 10 and a series of local stations 100, 200, 300 etc. arranged in parallel with each other and with the central station 10 along the two lines of a transmission bus 20 (only the station 100 is shown, the further stations being identical in construction and operation).

The central station 10 comprises an NPN transistor 11, which is driven via its base and whose collector is connected to a voltage source 16, in the present case a 12-V source, via a resistor 12. Initially the transistor 11 is cut off and the supply voltage present at the collector of this transistor is transmitted to each of the stations 100, 200, 300 etc. via the bus 20. Simultaneously, the central station 10 emits a load signal comprising a square wave pulse of suitable length whose function will be described hereinafter.

Identical stations 100, 200, 300 etc., of which only the first station 100 will be described in detail, are connected in parallel with the bus 20. The principal component of the station 100 is a parallel-entry down-counter 110 which detects the state 0 0 0 0 (in the present case represented by 4 bits). A device of this type is available from, for example, Signetics Corp. under the designation HEF 4526 B. The supply voltage (in the present case 12 V) transmitted by the bus 20 is applied to a terminal $V_{DD}$ of the circuit 110 via a diode 120 and a capacitor 121, which together constitute an RC circuit with a large time constant. By means of an encoder wheel 122 having one input and four outputs associated with four resistors 123, 124, 125 and 126, having one of their ends connected to ground, this RC circuit enables the down-counter 110 to be loaded, via the four terminals $P_1$ to $P_4$, with a 4-bit digital word which is specific to each station and thus constitutes an identification word for the station. However, this load operation is possible only when a specific threshold value is reached, i.e. only if the signal transferred by the bus 20 has been high for a sufficiently long time. The network comprising the resistors 140, 142, the diode 141 and the capacitor 143 provides the discrimination between the load control signals applied to the terminal PL of the down-counter 110 and the other signals forming the actual interrogation pulses, as will be seen hereinafter.

The value of the identification word depends on the position of the encoder wheel 122, which is an electrical connection member as described in the U.S. patent application No. 790,634, which is a continuation application of U.S. application Ser. No. 514,762, filed on July 18, 1983. Said Application describes a connection member, in particular an electrical connection member, between a specific number n of separate parallel channels and a common channel. In order to make $2^n$ different combinations of connections between said common channel and the separate n channels, the connection member comprises $2^{n-1}$ connecting arms which are arranged in a circular pattern around the central part of the member in $2^{n-1}$ positions out of $2^n$ possible positions. The $2^{n-1}$ positions are selected in such a manner that consecutive step wise circular permutations of this member consecutively form each of said $2^n$ possible different combinations of connections between the common channel and the n parallel channels. In the present case this member is an electrical contactor between a common contact and four different parallel contacts, which are respectively connected to the terminals $P_1$ to $P_4$ of the down-counter 110. This means that the identification system described here may comprise up to sixteen different stations. However, this is merely an example and for a larger number of stations it is necessary only to use an electrical contactor for which, in accordance with the said Patent Application, n has been selected accordingly or, in the case of a very large number of stations, to use two or more contactors arranged in cascade.

Once the 4-bit words have thus been loaded into each local station, the voltage on the bus 20 initially goes to a low level (approximately 2 V) when transistor 11 in the central station 10 is turned on via its base. As a result transistors 13 and 14, which are normally conductive, are turned off immediately, the electrical continuity of the bus then being guaranteed by means of the resistor 12 which is arranged in parallel with the series arrangement of the transistor 14 and the resistor 15. Subsequently, transistor 11 is saturated and the voltage level on the bus 20 is zero but for the saturation voltage. Loading of the down-counters of the local stations under control of said first pulse, called the synchronizing pulse, applied by the central station is now terminated.

The next or interrogation cycle proceeds as follows. After the synchronizing pulse in the preceding cycle the central station supplies a train of pulses which are all received by the local stations. A first characteristic of these interrogation pulses is that their length is smaller in comparison with the synchronizing pulse in order to ensure that the threshold value above which the down-counters of the local stations are loaded is not reached and the terminal PL of the down-counter 110 is not loaded by the discrimination network 140, 141, 142, 143. A second characteristic of said pulses is that, as will be described hereinafter, their declining edges (transitions from high level to low level) each start the down-counters synchronously with each other because these counters are controlled by a single clock signal. Said return to the low level of the interrogation pulses is obtained by means of short pulse signals which, as in the foregoing, are applied to the base of the transistor 11 of the central station 10 in order to turn on this transistor, thereby turning off the transistors 13 and 14 and bringing the voltage on the bus to its low level. At this instant the signal received on the clock input CP of the down-counters decrements the various 4-bit words initially loaded into these counters (during the load cycle) by one. As long as one of these words in one of the down-counters has not reached the state 0 0 0 0 the terminals TC of these down-counters are low (substantially 0.1 to 0.2 V). If one of the down-counters, for example the counter 110, reaches the state 0 0 0 0 and consequently the voltage on terminal CF is high, the voltage on terminal TC becomes high (approximately 12 V) and at the same time the voltage at point X, which is isolated from TC by a capacitor 131, increases by the same amount. This voltage at X, like that at Z, Y and B, was 12 V before the down-counter 110 reached the state 0 0 0 0. When TC goes from 0 to 12 V transistor 130 is turned on and, consequently, the voltage at B remains zero, at least as long as the voltage at terminal CF of the down-counter 110 remains above a specific threshold value (in the present case approximately 5.5 V). Since transistor 130 remains conductive and the low level at B is maintained, the length of the low level of the last interrogation pulse increases. This is a third characteristic of the interrogation pulses, namely the low levels following these pulses may have different lengths. This increased length is obtained when the digital word which is specific to a down-counter has reached the value 0 0 0 0 and the corresponding local station, which is now identified and interrogated, is supplying a specific answer to the central station 10, which answer comprises a modulation of the length of the interrogation pulse level. As soon as the voltage at the intermediate point Z, which is situated between X and Y and which is connected to these points by an impedance 132 and a resistor 133 respectively, has decreased so far that the voltage at terminal CF becomes lower than the threshold of 5.5 V, the voltage at terminal TC returns to its low level (at the same time transferring this return-to-zero to terminal CF via capacitor 131 and the impedances 132 and 135) and transistor 130 is consequently turned off, so that the low state after the interrogation pulses ceases because the voltage at B is again raised to 12 V.

It has been described how a local station is responsive to a pulse in the interrogation signal from the central station which corresponds to this station in that the time interval between this pulse and the next pulse (which in its turn corresponds to another local station) is increased. In fact, each local station must supply specific data. For example, in the case of a security and alarm system a station may inform the central station 10 (a) of the presence of an intruder in a room, or (b) of an attempt to intrude, the absence or occurrence of such events corresponding to an electrical contact being closed or opened. The answer of a local station to the central station should therefore contain said information "this contact open", "this contact closed" etc., which in the present case is achieved by modulating the length of the time interval between consecutive interrogation pulses.

This modulation of the length is obtained as follows. When the voltage on the bus goes to its low level the voltage on terminal TC becomes approximately 12 V for the station which detects that it is being interrogated and turns on transistor 130 so that the short-circuit between the two connections of the bus is maintained for a variable time which is determined by the time constant of the different RC-circuits which may be formed by the capacitor 131 and the impedances 132, 133, 134 depending on the positions of the electrical contacts 151 and 152 (for example contact 151 open corresponds to an attempted sabotage and contact 152 open to the detection of an intruder).

The embodiment just described concerns a system in which the interrogation pulse signal transferred via the bus is active only for the high/low transitions. A variant may be proposed in which the low/high transitions of the interrogation signal also play an active part, namely in which they modulate the length of the interrogation signal in order to have the possibility of random access to the stations instead of sequential access only.

Figure 2:
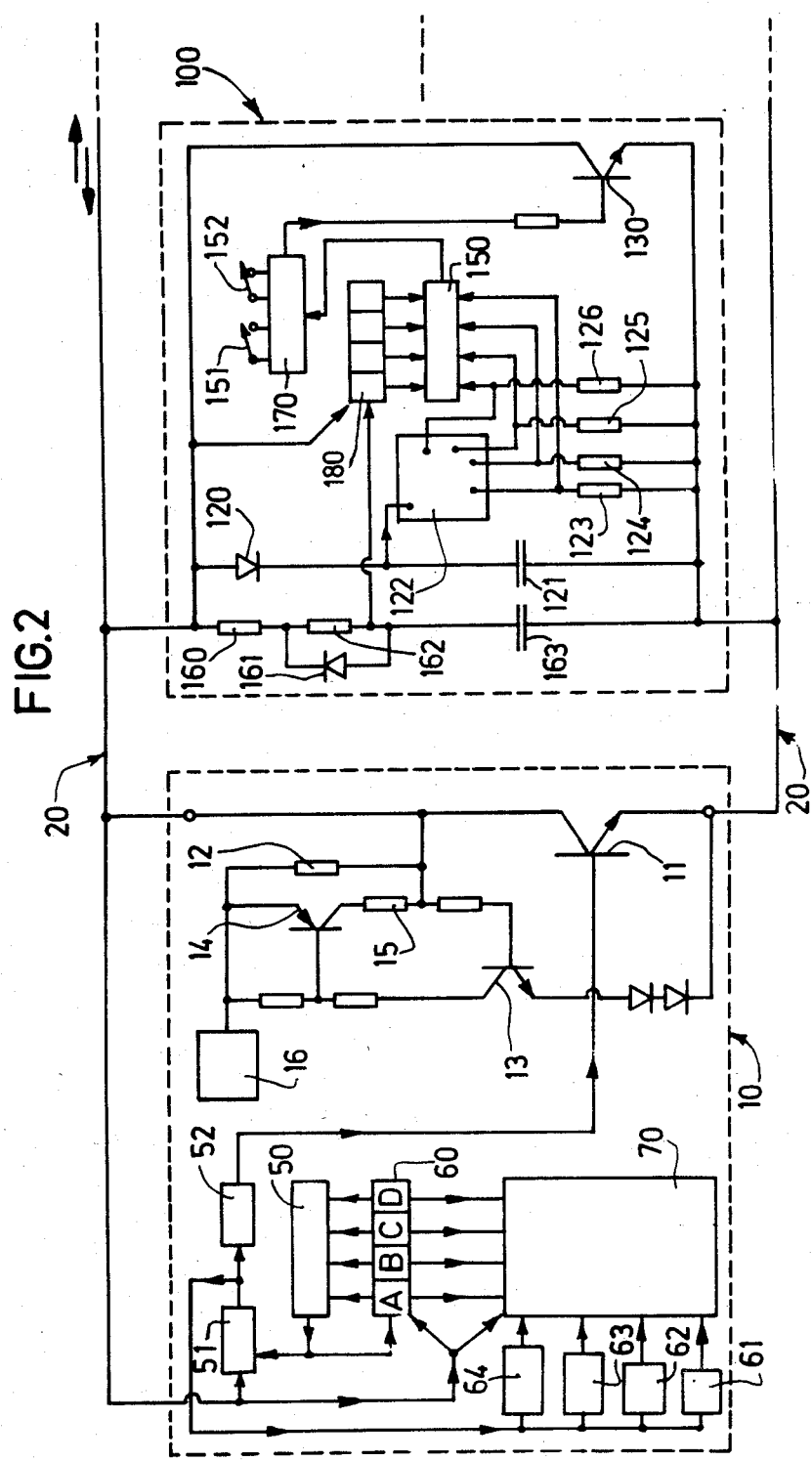

The corresponding station identification system is shown in FIG. 2 and operates as follows. As in the foregoing, in a first load cycle the same circuit comprising the diode 120, the capacitor 121, the encoder wheel 122 and the resistors 123 to 126 not only enables a 4-bit word, which of course differs from one local station to another, to be applied to a down-counter but also to the four first inputs of a digital comparator 150. The network comprising the resistors 160 and 162, the diode 161 and the capacitor 163 determines the actual instant at which this word is processed, which word is in fact applied to the comparator 150 when the capacitor 121 is high, i.e. constantly when the pulses appear on the bus 20 at regular intervals.

When transistor 11 of the central station is turned on once each local station has thus been loaded the voltage on the bus goes to its low level after a specific length of the high state which is determined in the central station 10 by the output signal of a logic function generator 50. For example a great length if said output signal is 0 and a small length if this signal is 1. When, after said high/low transition, an inhibit period T of the monostable 51 has elapsed, four time windows of different magnitude are generated by means of the monostables 61 to 64

(which time windows enable the answers of the local stations to be differentiated, as will be seen hereinafter). At the same time a shift-register 180, 280 etc. of each local station 100, 200 etc. receives a 1 or 0 depending on whether the high state of the bus before turning-on of the transistor 11 (i.e. before the answer from the station) is long or short, which digital signal is available at the output of the discrimination circuit comprising the elements 160, 161, 162 and 163. When this has been repeated, after four loading operations of the register 180, the register contains the digital word which has been transmitted by the central station 10 and which is also present in a shift register 60. This digital word is applied to the four second inputs of the digital comparator 150, which detects whether the word received during the interrogation by the central station 10 and the word entered by means of the encoder wheel 122 are identical. In the case of identity a monostable 170 is triggered and generates a pulse whose length, in the same way as in the first embodiment, depends on the position of two electrical contacts 151 and 152. This length is equal to the conduction period of transistor 130, which operates in the same way as in the foregoing. The transistor is turned off at four different instants depending on the position of said contacts. This position can thus be determined by detecting the state of the monostables 61 to 64, some of which are still active and others are not active at the instant that transistor 130 is turned off. Subsequently, via four parallel channels the states of these four multivibrators are transferred to a memory 70, which via four other parallel channels also receives an indication of the state of the register 60. Thus, after one complete interrogation cycle of the local stations 100, 200 etc. the contents of the memory exactly represents the state of the electrical contacts of these stations and in this way access to any local station is possible in only four stages.

It is obvious that the present invention is not limited to the embodiments described in the foregoing, to which various modifications are possible within the scope of the invention. In particular, only one interrogation sequence of the local station by the central station has been described in the foregoing. In the field of security it is not unusual to regard a change of state which has been detected only once or in a perfunctory manner as a false alarm. Such an alarm will be confirmed only if this state is detected during a plurality of consecutive interrogation cycles.

Furthermore, the interrogation capacity of the system described is limited to sixteen local stations, because the digital words specific to each station comprise only four bits. It is obvious that the invention is not limited thereto and that the length of the different digital words may be adapted to the number of stations to be connected to the system and should at least correspond to this number.

What is claimed is:

1. A station-identification system comprising a central interrogating station and a plurality of M local stations coupled in parallel with each other along a transmission bus which connects them to said central station, characterized in that:
(A) an output stage of the central station supplies to the transmission bus a station-interrogation signal comprising a synchronizing pulse of a first length during which it has a high level and M interrogation pulses of a second length which have a high level and comprises, a d.c. system-supply source, a first transistor receiving a drive signal at its control electrode so as to be turned on only in the intervals separating the pulses of the interrogation signal, second and third transistors turned on only during the pulses of the interrogation signal and controlled into conduction by turning off the first transistor, and resistors coupled to said transistors to provide the correct drive and bias for said transistors;
(B) each local station, which receives the interrogation signal from the output stage of the central station and returns a specific answer signal to said central station, which answer signal represents the state of at least one detection circuit in said local station, comprises a sequential loading circuit for the temporary storage of a digital identification word which is specific to said station, said loading circuit comprising a series network including a diode and a capacitor coupled in parallel with the bus and connected to an input of an encoder wheel having N outputs that enable an N-bit digital identification word to be defined, $2^N$ being greater than or equal to the number M of stations, a discrimination circuit for validating said word, a comparator circuit for comparing said temporarily stored digital word with a digital reference word, and a circuit for returning the answer signal to the central station via the transmission bus when the compared words are identical.

2. A system as claimed in claim 1, characterized in that the comparator circuit comprises a down-counter which decrements the temporarily stored digital word by one each time that said counter receives an interrogation pulse and which changes its state when said digital word reaches the value zero.

3. A system as claimed in claim 1, characterized in that the comparator circuit comprises an encoder wheel, a register and a digital comparator that changes state when the contents of the register and the state of the encoder wheel are identical.

4. A system as claimed in claim 3, characterized in that, for controlling the first transistor by the interrogation signal, the output stage of the central station comprises, means for generating a signal comprising interrogation pulses of two different lengths which follow each other such that at least M of the consecutive combinations of N consecutive interrogation pulses of said signal are different to enable an equal number of digital identification sequences for said local stations to be formed.

5. A system as claimed in claim 1 wherein the circuit for returning the answer signal comprises RC-circuits with different time constants depending on whether electrical contacts are in an open or a closed position so as to control the supply of answer signal pulses of corresponding different lengths when the relevant station is interrogated.

6. A communication system comprising a central interrogating station coupled to a plurality of M local stations via a pair of transmission lines, characterized in that:
(A) the central station comprises, an output stage that supplies a station-interrogation signal to the transmission lines, said interrogation signal comprising a synchronizing pulse of a first length and M interrogation pulses of a second length, a d.c. supply voltage source, said output stage comprising, a first transistor coupled to the d.c. supply voltage and to the transmission lines, a second transistor coupled to the first transistor, means for coupling a drive signal to a control electrode of the first transistor to turn on the first transistor in intervals between the pulses of the interrogation signal and to turn off the first transistor which in turn controls the second transistor into conduction only during the pulses of the interrogation signal, (B) each local station comprises, a sequential loading circuit including means for temporary storage of a digital word that identifies said local station, said loading circuit including a diode and a capacitor connect in series circuit to the transmission lines and an encoder circuit having an input connected to the series circuit and N outputs that define an N-bit digital identification word, $2^N \geq M$, a discrimination circuit coupled to the transmission lines for validating said digital word, means for comparing a temporarily stored digital word with a digital reference word, and an output circuit responsive to the comparing means to supply an answer signal to the central station via the transmission lines when the compared digital words are identical.

7. A system as claimed in claim 6 wherein the comparing means of a local station comprises a down-counter that provides said temporary word storage and which decrements by one the stored word each time it receives an interrogation pulse, said counter producing an output signal when the stored digital word reaches a zero value.

8. A system as claimed in claim 7 wherein the series circuit of the diode and capacitor are coupled to an input of the down-counter and have a time constant of a value that inhibits operation of the down-counter for pulse signals received from the transmission lines of less than a predetermined time duration.

9. A system as claimed in claim 6 wherein each local station further comprises one or more RC circuits coupled to said output circuit and with electrical contacts connected in circuit so as to vary the RC time constants thereof in a manner to provide answer signal pulses of different lengths when said local station is interrogated by the central station.

* * * * *